United States Patent
Kahlman et al.

(10) Patent No.: US 6,898,028 B2
(45) Date of Patent: May 24, 2005

(54) OPTICAL DEVICE AND OPTICAL REPRODUCING APPARATUS

(75) Inventors: Josephus Arnoldus Henricus Maria Kahlman, Eindhoven (NL); Gerard Eduard Rosmalen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/494,510

(22) PCT Filed: Oct. 18, 2002

(86) PCT No.: PCT/IB02/04336

§ 371 (c)(1),
(2), (4) Date: May 4, 2004

(87) PCT Pub. No.: WO03/041065

PCT Pub. Date: May 15, 2003

(65) Prior Publication Data

US 2004/0264351 A1 Dec. 30, 2004

(30) Foreign Application Priority Data

Nov. 7, 2001 (EP) .............................................. 01204273

(51) Int. Cl.⁷ .............................. G02B 7/02; G11B 7/00; H04N 7/64
(52) U.S. Cl. ...................... 359/811; 359/824; 359/814; 369/107; 369/44.32; 369/44.18; 369/53.34; 369/112.23; 386/115
(58) Field of Search ................................ 359/811, 814, 359/824; 369/44.15, 44.16, 44.22, 44.18, 44.32, 53.34, 107, 112.23, 53.18, 124.13; 386/115; 720/675, 676, 682, 689, 688

(56) References Cited

U.S. PATENT DOCUMENTS

| | | | | |
|---|---|---|---|---|
| 5,065,253 A | * | 11/1991 | Ishii ............................ | 386/115 |
| 5,615,204 A | * | 3/1997 | Watanabe et al. ........... | 720/679 |
| 5,724,197 A | * | 3/1998 | Barnes et al. ............... | 359/824 |
| 5,933,407 A | * | 8/1999 | Watanabe et al. ........... | 720/677 |
| 5,963,535 A | * | 10/1999 | Yamakawa et al. ......... | 720/676 |
| 6,134,058 A | | 10/2000 | Mohri et al. ................ | 359/824 |
| 6,473,389 B2 | * | 10/2002 | Hirai et al. ................. | 720/682 |
| 6,574,052 B2 | * | 6/2003 | Suh ............................. | 359/814 |
| 6,845,067 B2 | * | 1/2005 | Ohtsu ....................... | 369/44.32 |

\* cited by examiner

*Primary Examiner*—Loha Ben
(74) *Attorney, Agent, or Firm*—Michael E. Belk

(57) ABSTRACT

An optical reproducing apparatus in which reproduction of information is carried out by using an optical record carrier. In order to compensate a radial tilt between the surface of the record carrier and the objective lens, the objective lens is tilted. In the optical apparatus of the invention, the actuator of the radial displacement of the objective lens is used to also tilt the objective lens at the same time. A displacement of the objective lens in the radial direction by the actuator has a direct effect of tilting the objective lens. This is accomplished by a mechanical link between the radial displacement and the radial tilting. This has the advantage that there is no need for an extra tilt actuator to tilt the objective lens.

5 Claims, 2 Drawing Sheets

OPTICAL DEVICE AND OPTICAL REPRODUCING APPARATUS

The invention relates to an optical device for following a track on a surface of an optically readable record carrier to be incorporated therein, the device comprising:
- a lens;
- a relative displacement unit which, during operation, is capable of supporting the record carrier and of causing a relative displacement of the record carrier with respect to the lens, the relative displacement in a first direction being parallel to the track and in a first plane being parallel to the surface of the record carrier to be incorporated;
- a slide having a supporting face which, during operation, is displaceable in a second direction transverse to the track and along the surface of the record carrier to be incorporated;
- a slide displacement unit for displacing the slide in the second direction dependent on a slide position signal, and
- an actuator comprising:
  - a radial displacing means for positioning, during operation, the lens in the second direction;
  - a tilting means which is capable of tilting the lens in a second plane transverse to the track to be followed;
  - a lens support for supporting the lens;
  - at least two connection elements which are secured to the supporting face of the slide and to the lens support.

An embodiment of an optical device is known from EP-A-0 824 256.

In the known optical device, the connection elements are placed in such a way that a displacement in a focal direction, transverse to the record carrier, also results in a tilt in the first plane. The record carrier often has the shape of a round disc, for example a CD or DVD. The connection pieces are placed in such a way that there is a given relationship between a deviation in the focal direction and the extent of tilting the lens. The background is that there is a tilt of the lens when the record carrier has a given curvature along the surface, which curvature necessitates readjustment of the lens in the focal direction. By readjusting the lens in the focal direction, the tilt of the lens is changed. Consequently, when the tilt of the lens is also adapted in a correct direction by displacing the lens in the focal direction, the total tilt of the lens with respect to the record carrier is reduced. This has the drawback that a change of focus also occurs when the lens is displaced in the focal direction so as to obtain a given tilt. The tilt can thus not be checked arbitrarily without the focus remaining optimal. Since an optimal focus is required for a satisfactory performance, it is therefore impossible to adjust a given tilt independently of the focus.

It is a first object of the invention to provide an optical device of the type described in the opening paragraph, in which the tilt is adjustable and an optimal focus is maintained.

It is a second object of the invention to provide an optical reproducing apparatus for reading information on a record carrier to be optically read, which apparatus is provided with such an optical device.

According to the invention, the first object is achieved with the optical device in that there is a mechanical coupling between the radial displacing means and the tilting means for tilting the lens upon a displacement of the lens in the second direction.

When, during operation, the tilt must be changed, the lens is controlled by the actuator in the second direction. The second direction is further also denoted as radial direction. The change of the radial position of the lens by the actuator results in a tilt of the lens. The lens is displaced in the radial direction until the desired tilt is achieved.

The optical device has the further advantage that it does not need to be provided with an extra actuator so as to change the tilt of the lens because use is made of the radial displacement actuator which is also present. In EP-A-0 824 256 there is neither an extra actuator for adjusting the tilt, but here the tilt can be adjusted without changing the focus.

The radial position of the lens with respect to the track to be followed is changed in the radial direction due to the displacement of the lens. In an advantageous embodiment, the slide displacement unit therefore comprises an adding means for adding an offset to the slide position signal. By adding the offset, the displacement of the lens in the radial direction is compensated by a displacement of the slide in the radial direction. The net effect is that the lens is tilted and that the radial position of the lens with respect to the track is maintained.

A useful implementation may also work the other way around. To obtain a desired tilt of the lens, an offset can be added to the slide position signal. As a result, the slide is displaced in the radial direction so that also the lens is displaced in the radial direction. A control driving the actuator to follow the track in the radial direction drives the actuator for compensating the displacement of the lens in the radial direction. Since the actuator displaces the lens in the radial direction, the lens tilts in the second plane, with the result that the desired tilt is obtained. It is therefore sufficient in this embodiment to add an offset to the slide position signal so as to obtain a tilt of the lens.

In one embodiment, each connection element comprises at least two connection pieces which are flexible in a third plane parallel to the second plane and are rigid in a third direction transverse to the third plane, the connection pieces of a first connection element extending at a first angle to each other in a fourth plane parallel to the first plane, and the connection pieces of a second connection element extending at a second angle to each other in a fifth plane parallel to the first plane, the first angle differing from the second angle and the fourth plane being situated at a different distance from the first plane than the fifth plane.

By way of example, the first angle is assumed to be 0 degrees and the second angle is assumed to be 10 degrees. In the case of a displacement in the radial direction, the forces in the first connection element ensure that they displace the lens in the radial direction without rotation of the lens when the forces of the second connection element are left out of consideration. The forces in the second connection element ensure that, when leaving the forces of the first connection element out of consideration, the lens is displaced in the radial direction but it also rotates in a sixth plane parallel to the first plane. However, this rotation is counteracted by the first connection element because they are rigid in the third direction. The connection pieces will therefore find another path. Since the connection pieces in the third plane are flexible, they will move in the third plane. Consequently, the lens starts rotating in the second plane.

Different combinations of angles are alternatively possible. In the foregoing example, the first angle is 0 degrees. However, this angle may have a different value as long as the first angle differs from the second angle. Moreover, the angle at which a first connection piece of a connection element extends to the third direction does not need to be equal to the angle at which a second connection piece of the same connection element extends to the third direction. They may thus be situated asymmetrically with respect to the third direction.

In a further embodiment, the connection pieces are threads.

Threads are relatively thin wires having a given stiffness allowing movement in two directions transverse to the wire and are rigid in one direction longitudinal to the wire. In the embodiment, the two directions in which movement is possible are the radial direction and the focal direction. In the tangential direction, the wires are rigid. The tangential direction is defined as being a direction transverse to the radial direction and transverse to the focal direction.

The second object is achieved in that the optical reproducing apparatus for reading information on an optically readable record carrier is provided with the optical device according to the invention.

The optical reproducing apparatus further comprises:

a laser device for passing a laser beam through the lens to the record carrier and for receiving a reflected beam for conversion into an electric signal;

a slide displacement unit for displacing the slide in the second direction;

a processing unit for producing a processed signal suitable for further processing, which signal is derived from the electric signal;

a bit detector unit for converting the processed signal into a bit stream, and a channel decoding unit for decoding the bit stream.

The optical reproducing apparatus according to the invention is capable of compensating a radial tilt of the surface of the record carrier with respect to the lens during operation.

These and other aspects of the invention are apparent from and will be elucidated with reference to the embodiments described hereinafter.

Figure 1:
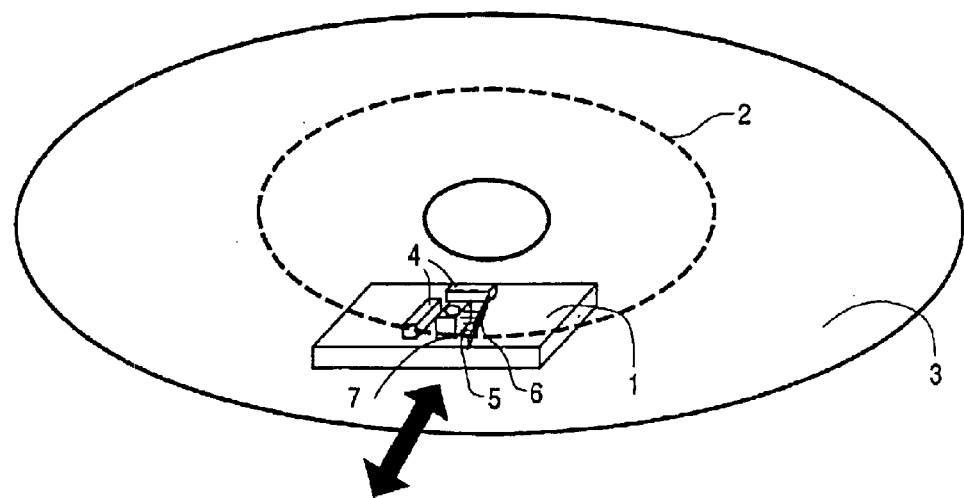
FIG. 1 shows the optical device with a record carrier in a perspective view.
Figure 3A:
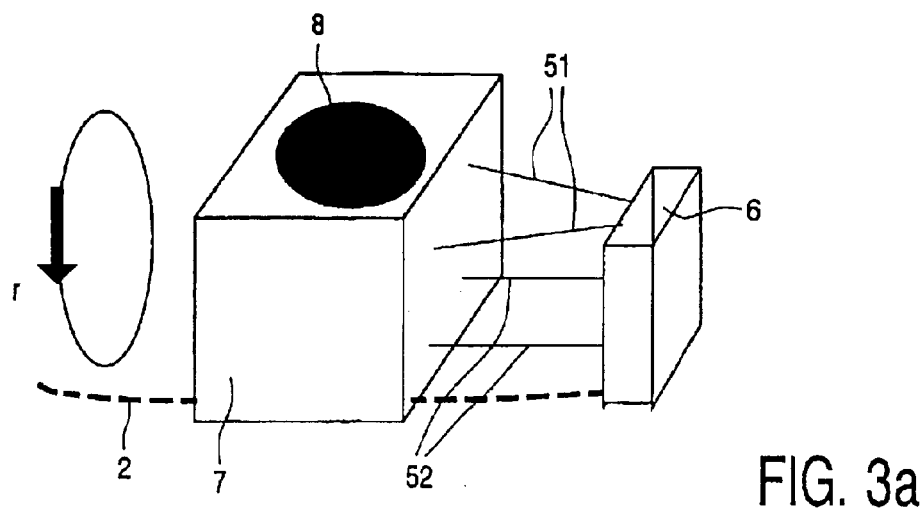
FIG. 3a shows a lens and a lens support in a perspective view, in which the first angle between the connection pieces of the first connection element differs from the second angle between the connection pieces of the second connection element.

FIG. 1 shows an embodiment of the optical device for following the track 2 on a surface of an optically readable record carrier 3 to be incorporated therein. The slide 1 is displaceable transversely to the track 2. The lens 8 is shown in FIG. 3a. The lens 8 is retained by a lens support 7.

Figure 4:
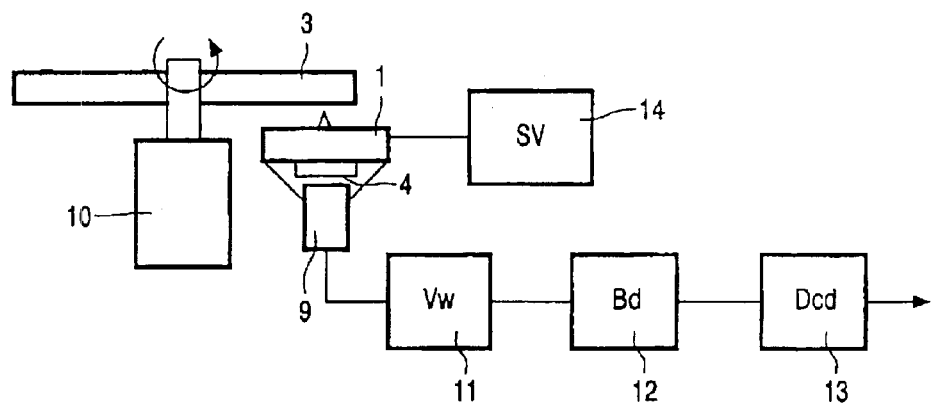
FIG. 4 is a block diagram of an optical reproducing apparatus according to the invention.

FIG. 4 shows diagrammatically the relative displacement unit 10. In this embodiment, the record carrier 3 is rotated so as to realize a relative displacement.

Figure 3B:
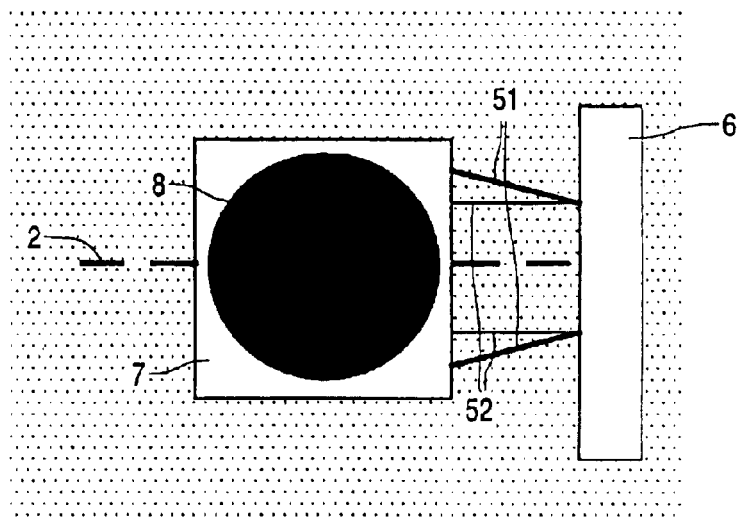
FIG. 3b shows the lens and the lens support of FIG. 3a in a plan view.
Figure 3C:
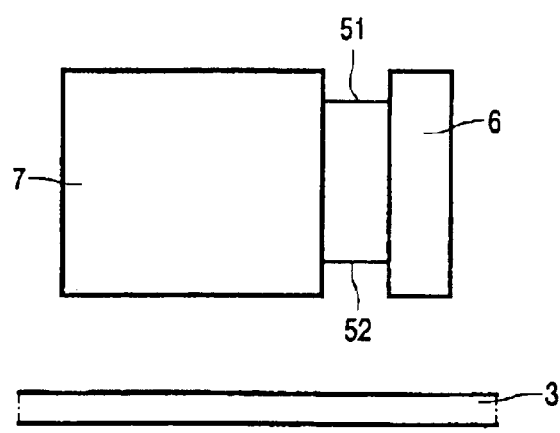
FIG. 3c shows the lens and the lens support of FIG. 3a in a side elevation.

The actuator 4 comprises a radial displacing means, a tilting means, a lens support 7 and at least two connection elements 5. In FIGS. 3a, 3b and 3c embodiments are shown in which the connection elements 5 comprise two connection pieces each. The connection pieces are secured at one end to the supporting face 6 and at the other end to the lens support 7. FIG. 3b shows that the first angle between the connection pieces of the first connection element 51 differs from a second angle between connection pieces of the second connection element 52. FIG. 3c also shows that the fourth plane in which the connection pieces of the first connection element 51 are situated is at a different distance from the surface of the record carrier 3 to be incorporated than the fifth plane where the connection pieces of the second connection element are situated.

When the lens 8 and the lens support 7 are displaced in a radial direction by the actuator, the forces in the connection element 5 will rotate the lens 8 and the lens support 7 in the second plane. The rotation is shown in FIG. 3a by means of the arrow r. When the lens is displaced in the opposite radial direction, the rotation will also be in the opposite direction.

When the radial tilt of the lens 8 with respect to the surface of the record carrier 3 is measured in a certain way, it is possible to compensate for this radial tilt by giving the lens 8 an opposite radial tilt. This radial tilt is obtained by displacing the lens in the radial direction by means of the actuator. However, in order that a radial position of the lens 8 is not changed with respect to the track 2, the radial position of the slide 1 is displaced in the opposite radial direction. Measurement of the radial tilt of the lens 8 with respect to the surface may be effected, for example, by means of a tilt sensor. However, there are also other methods of measuring the radial tilt, which methods do not use a tilt sensor but make use of the electric signal as a result of the reflected beam or of the control signals to the actuator 4.

Figure 2:
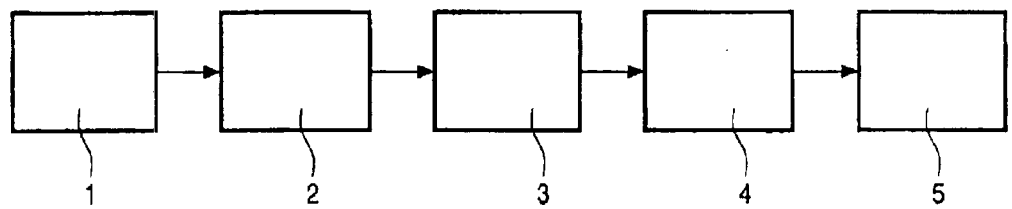
FIG. 2 is a block diagram showing the control of a radial tilt of the lens by controlling an offset in the radial position of the slide, which control makes use of the optical device according to the invention.

In block 1 of FIG. 2, a measuring signal is made which is representative of the radial tilt of the lens 8 with respect to the record carrier 3. The measuring signal is converted in block 2 into a filtered signal by filtering the measuring signal. In block 3, the filtered signal is added to the slide position signal. The control of the lens 8 at a given radial position of the track 2 to be followed will control back the change of radial position of the lens 8, which is indicated by means of block 4. The radial tilt of the lens 8 will therefore also change, which is indicated in block 5.

In FIG. 4, the laser device 9 passes a laser beam through the lens 8 and the laser beam is reflected by the record carrier 3. The relative displacement unit 10 is capable of causing a relative displacement in the radial direction of the slide 1 with respect to the track 2 to be followed. Furthermore, the slide 1 can be displaced in a radial direction transverse to the track 2 by means of a slide displacement unit 14. The processing unit 11 is capable of converting the electric signal from the laser device 9 into a processed signal which is suitable for further processing. The bit detection unit 12 is capable of converting the processed signal into a bit stream. Furthermore, the channel decoding unit 13 is capable of decoding the bit stream.

What is claimed is:

1. An optical device for following a track (2) on a surface of an optically readable record carrier (3) to be incorporated therein, the device comprising:

a lens (8);

a relative displacement unit (10) which, during operation, is capable of supporting the record carrier (3) and of causing a relative displacement of the record carrier (3) with respect to the lens (8), the relative displacement in a first direction being parallel to the track (2) and in a first plane being parallel to the surface of the record carrier (3) to be incorporated;

a slide (1) having a supporting face (6) which, during operation, is displaceable in a second direction transverse to the track (2) and along the surface of the record carrier (3) to be incorporated;

a slide displacement unit (14) for displacing the slide in the second direction dependent on a slide position signal; and an actuator (4) comprising:
- a radial displacing means for positioning, during operation, the lens (8) in the second direction;
- a tilting means which is capable of tilting the lens (8) in a second plane transverse to the track (2) to be followed;
- a lens support (7) for supporting the lens (8);
- at least two connection elements (5) which are secured to the supporting face (6) of the slide (1) and to the lens support (7), characterized in that there is a mechanical coupling between the radial displacing means and the tilting means for tilting the lens (8) upon a displacement of the lens (8) in the second direction.

2. An optical device as claimed in claim 1, characterized in that the slide displacement unit comprises an adding means for adding an offset to the slide position signal.

3. An optical device as claimed in claim 1, characterized in that each connection element (5) comprises at least two connection pieces which are flexible in a third plane parallel to the second plane and are rigid in a third direction transverse to the third plane, the connection pieces of a first connection element (51) extending at a first angle to each other in a fourth plane parallel to the first plane, and the connection pieces of a second connection element (52) extending at a second angle to each other in a fifth plane parallel to the first plane, the first angle differing from the second angle and the fourth plane being situated at a different distance from the first plane than the fifth plane.

4. An optical device as claimed in claim 3, characterized in that the connection pieces are threads.

5. An optical reproducing apparatus for reading information on an optically readable record carrier (3), provided with an optical device as claimed in claim 1.

* * * * *